Nov. 9, 1965  W. J. FLAHERTY ETAL  3,216,132
TEST SCORING MACHINES
Filed June 26, 1961  5 Sheets-Sheet 1
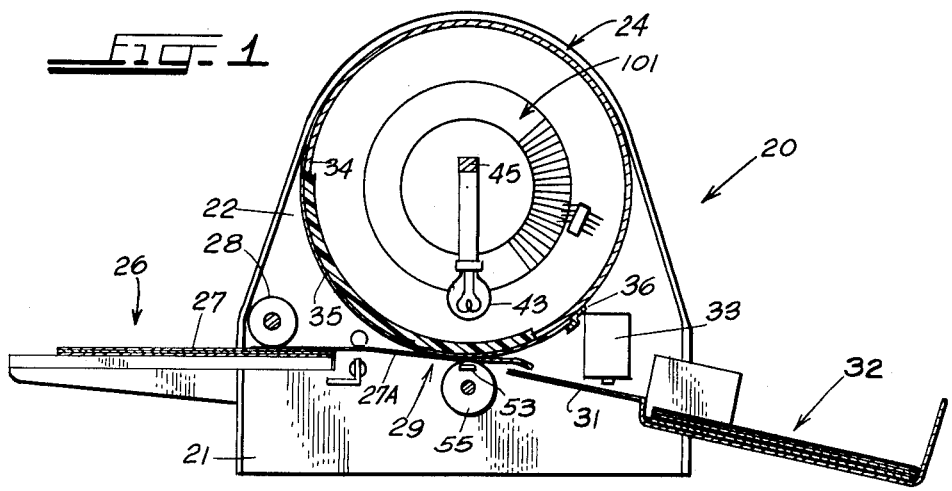
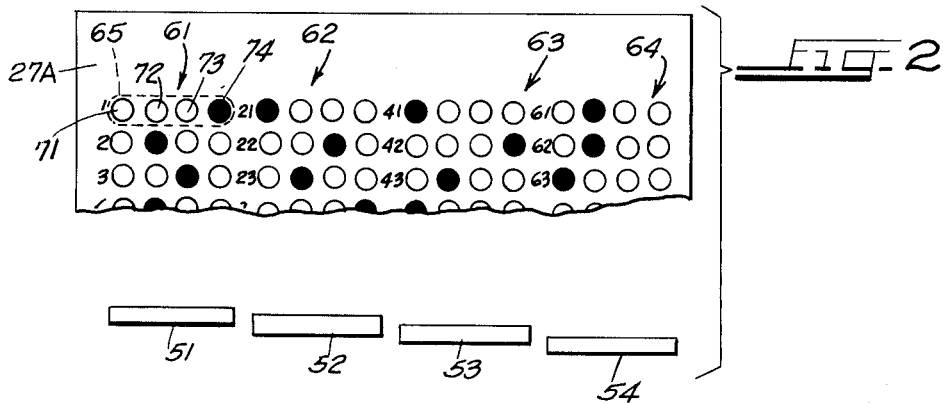
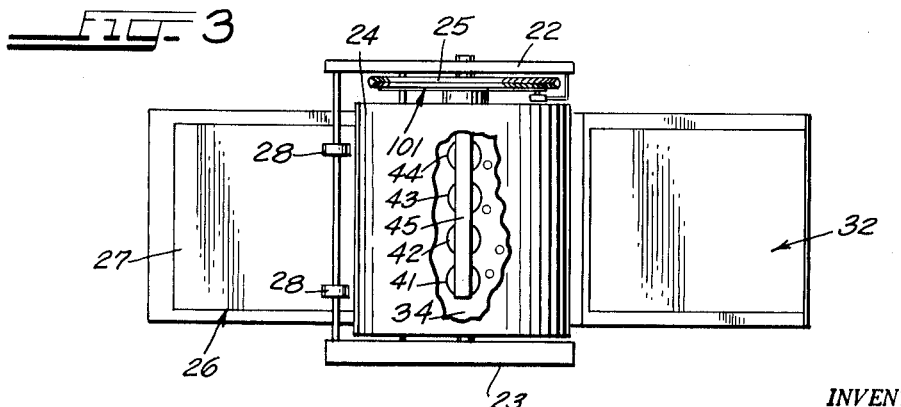
INVENTORS:
WILLIAM J. FLAHERTY
GERALD J. GOOTEE
BY
Wallace, Kinger & Horn
ATTYS.

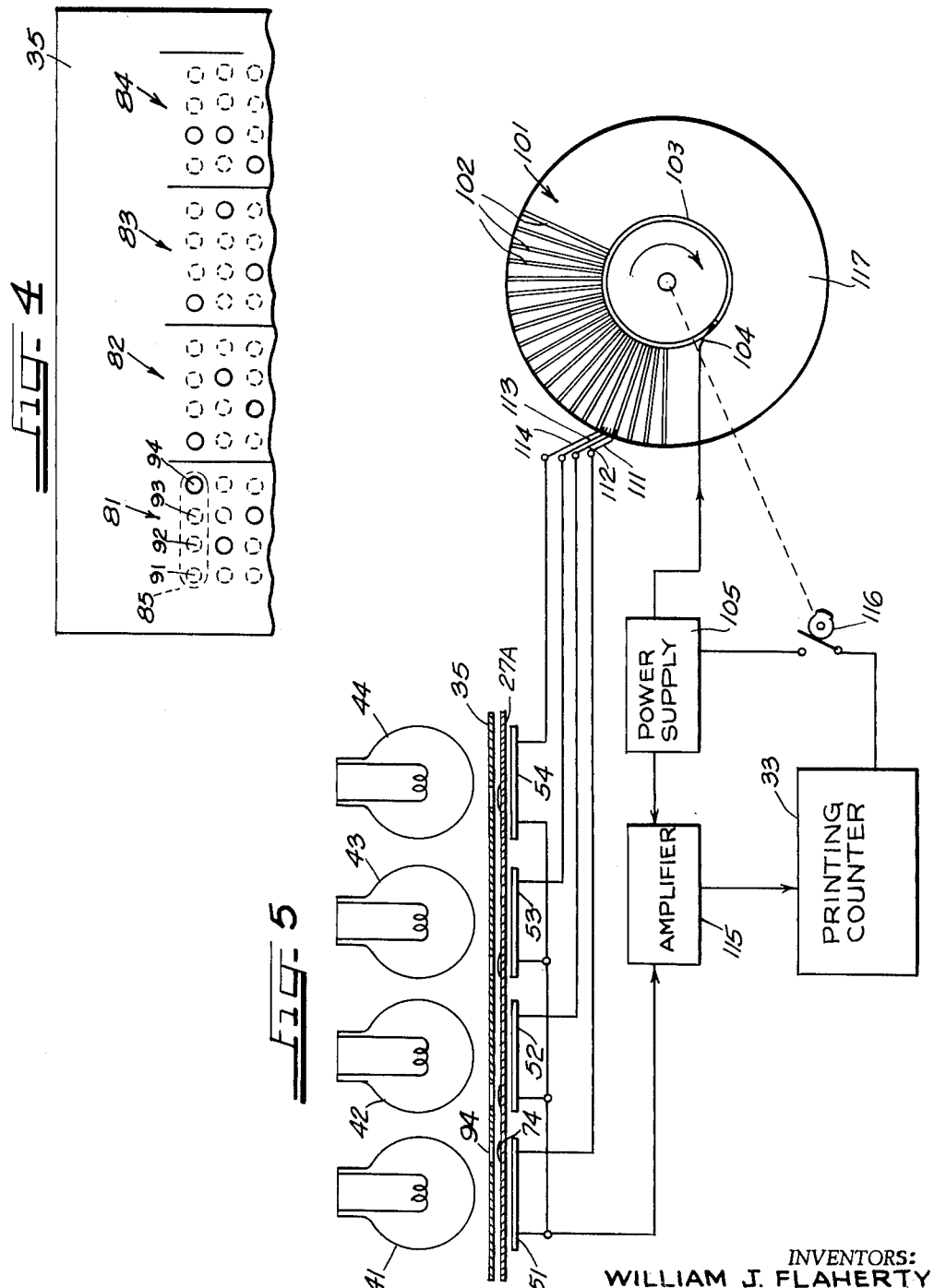

Nov. 9, 1965    W. J. FLAHERTY ETAL    3,216,132
TEST SCORING MACHINES
Filed June 26, 1961    5 Sheets-Sheet 3
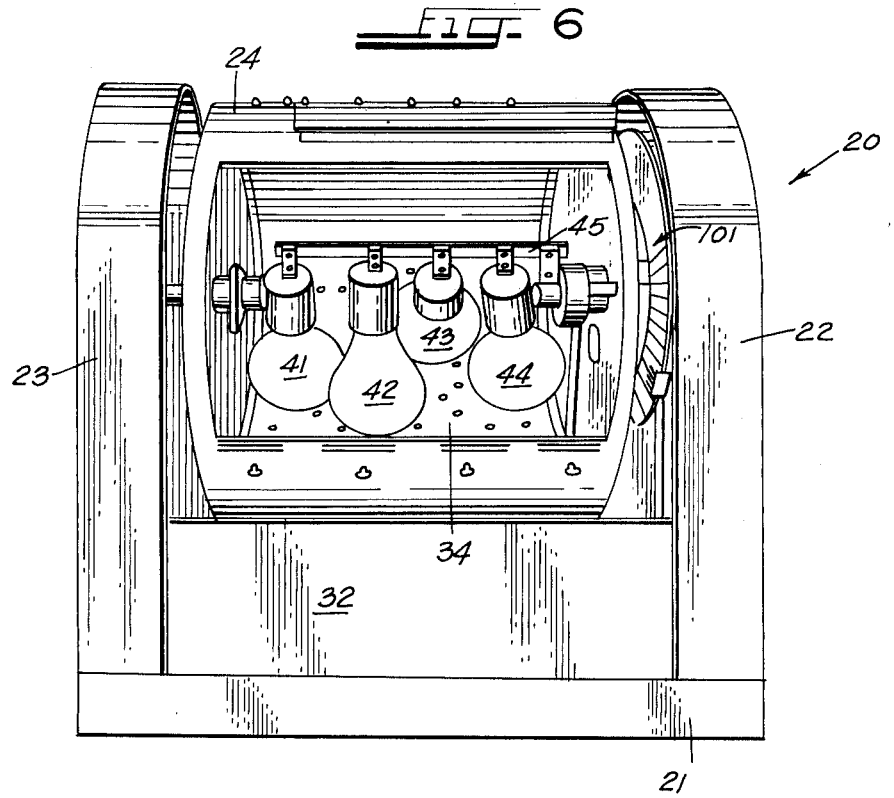
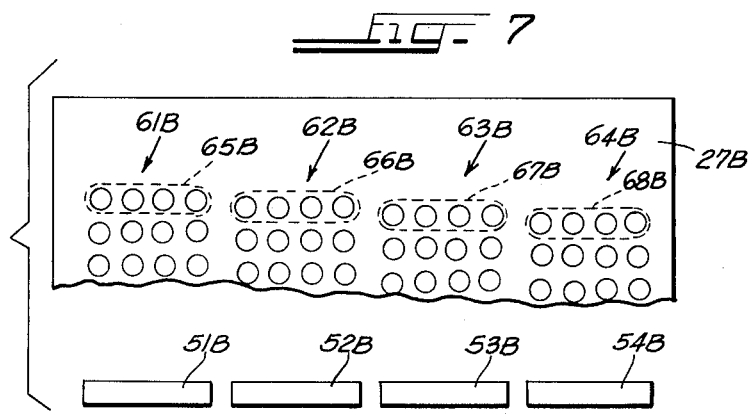
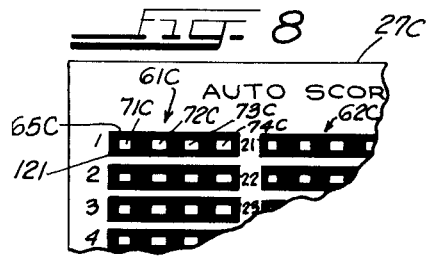
INVENTORS:
WILLIAM J. FLAHERTY
GERALD J. GOOTEE
BY
Wallace, Kinzer & Horn
Attys.

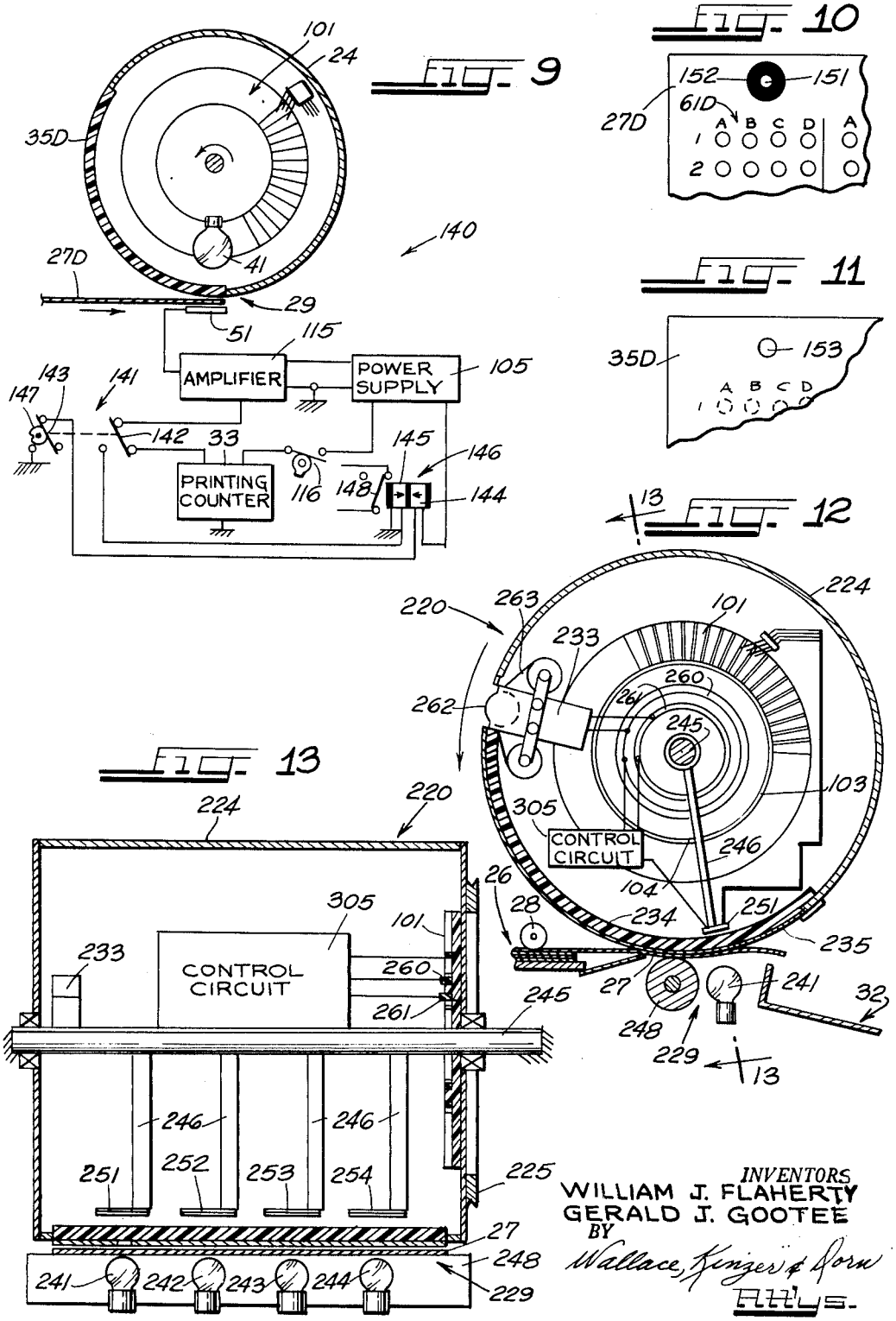

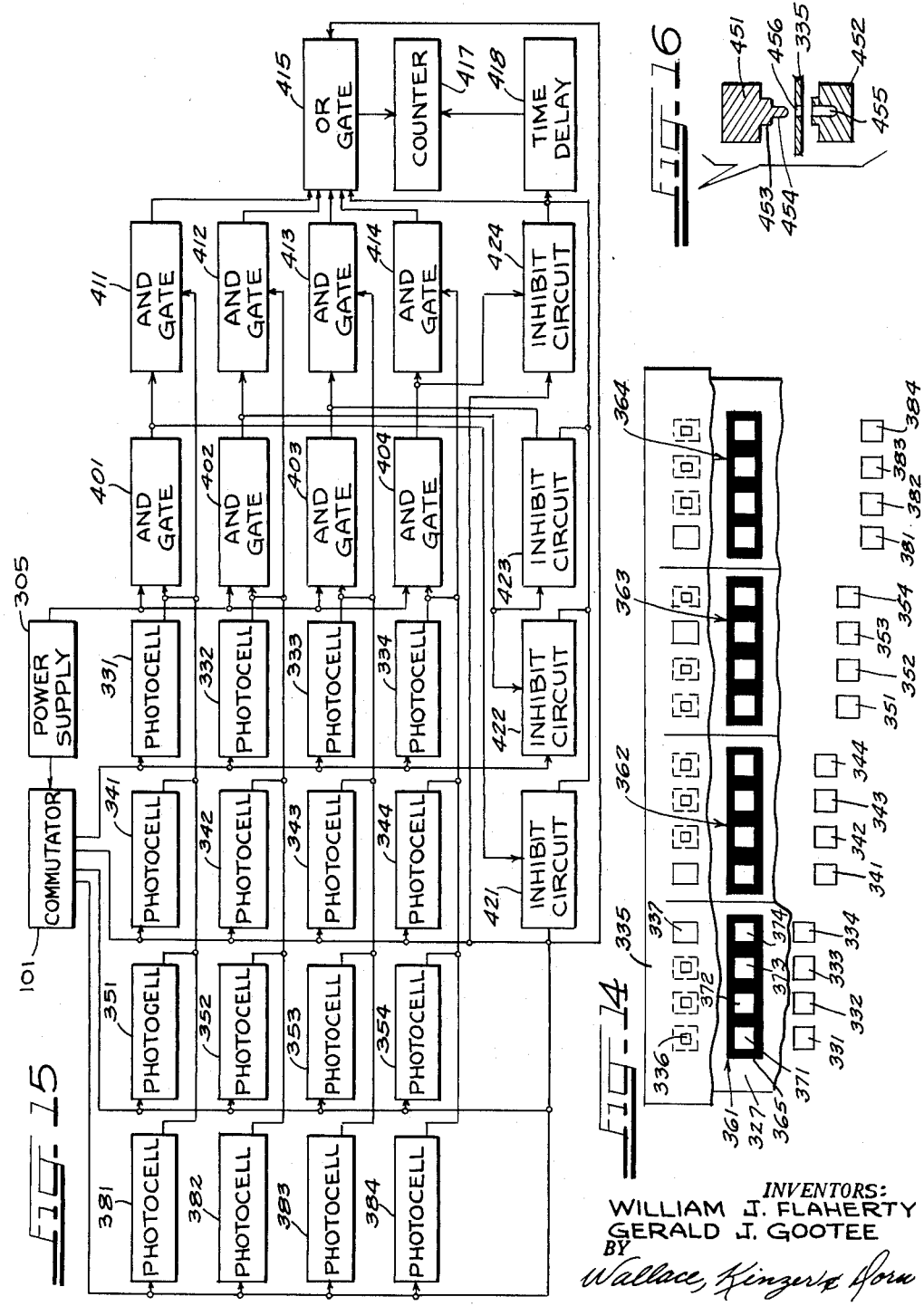

3,216,132
TEST SCORING MACHINES
William J. Flaherty, Davenport, and Gerald J. Gootee, Manchester, Iowa, assignors of nine and one-third percent to Vincent F. Same, nine and one-third percent to Irvin L. Murray, Jr., and nine and one-third percent to Norman M. Peterson, all of Davenport, Iowa
Filed June 26, 1961, Ser. No. 120,898
10 Claims. (Cl. 35—48)

This invention relates to a new and improved automatic test scoring system. More particularly, the invention relates to a new and improved high-speed scoring machine for scoring multiple-answer test sheets by photoelectric comparison with a master sheet. The invention also relates to a new and improved form of test sheet which is particularly advantageous when utilized in a photoelectric scoring system. This application is a continuation-in-part of application Serial No. 42,031, filed July 11, 1960, and now abandoned.

The increasing use of multiple-answer tests in educational and other applications has resulted in an increasing need for automatic scoring machines, since the volume of test papers makes manual scoring impractical in many instances. Machine scoring has been applied in the past to tests of various kinds, particularly where the answers may be indicated by pencil marks or other markings upon a test sheet having multiple-answer areas for each question of the examination. Some of the previously known devices for scoring test sheets of this kind have included simple masks, which are visually compared with the answers on the test sheet. Other scoring systems have entailed the use of photoelectric scanning devices or direct electrical sensing devices for automatically comparing a master sheet, or answers stored in some other form, with the individual test sheets. In general, most of the prior art devices have either been of the simple visual-comparison type or have entailed the use of relatively large and complex automatic scoring mechanisms.

The visual comparison devices, although they alleviate the problem somewhat, do not afford an adequate solution to the scoring of multiple-answer tests where the volume of test sheets to be scored is really large. Consequently, devices of this kind are not particularly satisfactory as applied to the needs of large elementary schools and high schools or even relatively small institutions of advanced education. By the same token, these simple scoring devices are quite inadequate as applied to professional testing services, regardless of size. On the other hand, most school systems are not able to obtain and utilize the expensive and complex automatic scoring systems generally prevalent in the prior art because, in most instances the school budget is too limited with respect to funds available for such specialized equipment.

It is a principal object of the invention, therefore, to provide a new and improved high-speed automatic test scoring system which is accurate in operation yet quite low in cost. More particularly, it is an object of the invention to provide for automatic test scoring using apparatus generally comparable, in cost and complexity, to an inexpensive conventional duplicator.

A specific object of the invention is to modify a conventional spirit duplicator to afford a high-speed photoelectric test scoring machine.

Another object of the invention is to provide either a printed or visual score indication in a new and improved automatic test scoring system.

An additional object of the invention is to increase the accuracy of scoring, in a photoelectric test scoring machine, by means of a particular relationship between the photoelectric sensing devices employed for test scoring and the construction of the test sheets being scored. In accordance with one feature of the invention, this object is realized in part by a particular alignment of the photoelectric sensing devices with respect to the answer areas on the test sheet. Another feature of the invention which is also useful in realizing this object pertains to the construction of the test sheet itself and the use of a broad opaque border to identify answer areas on the test sheet.

Another object of the invention is to provide a simple yet highly accurate means for checking the alignment of a test sheet with a master answer sheet in an automatic test scoring machine.

An additional object of the invention is to provide a new and improved means for controlling the energization of individual photocells, in a photoelectric test scoring machine, to prevent spurious and undesired actuation of the photocells.

Another object of the invention is to provide a new and improved automatic test scoring system which is quite simple in operation and which requires no particular training or skill on the part of the person scoring the tests.

An important object of the invention is to provide a new and improved automatic test scoring machine which utilizes photoelectric sensing of test markings yet which makes it possible, in a relatively simple device, to afford a "right minus wrong" result.

A specific object of the invention is to provide a new and improved mask for use in a photoelectrically actuated test scoring system to enable direct derivation of a "right minus wrong" answer.

Other and further objects of the present invention will be apparent from the following description and claims and are illustrated in the accompanying drawings which, by way of illustration show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a simplified sectional side elevation view of an automatic test scoring machine constructed in accordance with one embodiment of the invention;

FIG. 2 illustrates one preferred alignment of the photoelectric sensing devices, in the machine of FIG. 1, with respect to a test sheet;

FIG. 3 is a plan view, partly cut away, of the test scoring machine of FIG. 1;

FIG. 4 is a detail view illustrating a part of a mask used in the apparatus of FIGS. 1 and 3;

FIG. 5 is a schematic illustration of the electrical system for the automatic test scoring machine of FIG. 1;

FIG. 6 is an end perspective view of the test scoring machine of FIGS. 1 and 3;

FIG. 7 is similar to FIG. 2 but illustrates an alternate alignment of the test sheet and the photocells;

FIG. 8 is a detail view showing a portion of a preferred form of test scoring sheet;

FIG. 9 illustrates another control circuit for the automatic test scoring machine including means for checking alignment of a master sheet with a test sheet at the beginning of a scoring operation;

FIG. 10 illustrates a part of a test sheet which may be employed in the embodiment of FIG. 9;

FIG. 11 illustrates a portion of a master answer sheet utilized in the embodiment of FIG. 9;

FIG. 12 is a sectional view, similar to FIG. 1, of another embodiment of the invention, and includes an illustration of the operating circuit therefor;

FIG. 13 is a simplified sectional view taken approximately as indicated by line 13—13 in FIG. 12;

FIG. 14 is a detail view illustrating a mask, a test sheet, and a photocell system for another embodiment of the invention;

FIG. 15 illustrates, in block diagram form, a data analysis circuit for the embodiment of FIG. 14; and FIG. 16 illustrates a punch used in preparing the mask of FIG. 14.

The automatic test scoring system illustrated in FIGS. 1–6, which comprises an initial embodiment of the invention, includes a test scoring machine 20, the mechanical construction of the machine 20 being best shown in FIGS. 1, 3 and 6. As illustrated therein, the test scoring machine 20 includes a base 21 which serves as a support for the machine. At the opposite sides of the machine 20 there are mounted a pair of frame members or support members 22 and 23 (see FIGS. 3 and 6). The frame members 22 and 23 support a rotatable drum 24. A drive motor for the drum 24 may be mounted within the base 21 of the machine, and the drive motor may be connected to the drum in mechanical driving relation by suitable means such as the pulley 25 (FIG. 3). Because the drive arrangement employed for the drum 24 is not critical, with respect to the present invention, the drive motor and other elements of the drive mechanism have been omitted from the drawings.

The test scoring machine 20 further includes a storage magazine 26 for storing a plurality of individual test sheets 27. Means, comprising a pair of feed rollers 28, are provided for feeding the test sheets 27 one-by-one from the storage station or magazine 26 through a sensing station generally identified by the reference numeral 29. From the sensing station 29, the individual test sheets continue their movement along a guideway 31 to a receiving hopper or magazine 32 that is mounted on the base 21 of the machine. The drive for the sheet feed mechanism of the machine 20 is synchronized with rotation of the drum 24, as explained hereinafter.

As thus far described, the machine 20 is substantially similar to a conventional spirit duplicator. In fact, this particular machine is constructed by modification of a commercially available spirit duplicator, such as the Model 418 Mineograph machine manufactured by A. B. Dick Company, of Chicago, Illinois. Because the sheet feeder, the drive for the rotary drum, and the other components of the machine as set forth hereinabove remain substantially unchanged, they have not been illustrated in detail in the drawings and only a brief description of their operation is deemed necessary herein.

At the beginning of a test scoring machine, the test sheets 27 are stacked in the storage magazine or station 26. When the machine is placed in operation, the sheets are fed one-by-one from the storage station 26 through the sensing station 29 and into the receiving hopper 32. As each of the sheets 27 passes through the sensing station 29, a sensing operation is performed to determine the test score, as explained in detail hereinafter. The scoring operation is completed at the time that the test sheet leaves the sensing station 29. Consequently, a test score can be printed on the test sheet as it traverses the guideway 31, as by means of a printing device 33. The test sheets stacked in the receiving hopper 32 are imprinted with their respective test scores, showing the results of the test scoring operation. During operation of the machine 20, the drum 24 is rotated in synchronism with the sheet feeding operation, the drive for the drum and the synchronizing means being essentially unchanged from the corresponding apparatus utilized in the spirit duplicator to synchronize rotation of the duplicator drum with the feeding of paper sheets through the duplicator.

The rotary drum 24 is not a duplicating drum in this instance, but is of modified construction to afford one part of the test scoring apparatus of the machine 20. The drum 24 may, in general, be constructed of sheet metal, but is provided with an open or transparent portion 34 which is large enough to expose most of the area of a master answer sheet 35 that is removably mounted on the drum. In some instances, it may be desirable to construct the portion 34 of the drum which carries the master sheet 35 from metal and simply to punch out apertures corresponding to all of the possible answer-indicating areas on the master sheet, as explained more fully hereinafter. On the other hand, the section 34 of the drum may be constructed as a fully transparent member to avoid any necessity for aligning the master sheet 35 accurately with individual apertures in the drum section 34. The master sheet 35 may be clamped or otherwise secured to the drum 24 by conventional clamping means generally indicated by the reference numeral 36. Since the clamp may be the same as those used in any conventional duplicator, it is not shown in detail in the drawings.

A light source is mounted within the confines of the rotary drum 24 in a position to illuminate the test sheets 27 as they traverse the sensing station 29. In the embodiment illustrated in FIGS. 1, 3, 5 and 6, the light source comprises four lamps 41, 42, 43 and 44 that are suspended from a stationary support member 45, the support member 45 extending approximately parallel to the axis of the drum. It is not necessary to utilize four individual lamps for the light source; a single elongated lamp may be employed for this purpose if desired, or other lighting arrangements may be utilized.

At the sensing station 29, there are provided four photoelectric sensing devices 51, 52, 53 and 54, which are individually aligned with the lamps 41, 42, 43 and 44 respectively. The photocells 51–54 may comprise any conventional type of photocell. Preferably, however, the photocells are solid-state photodiodes, such as type "B" series manufactured by International Rectifier Corp. One or more feed rollers 55 may be interspersed with the photocells 51–54 in the sensing station 29 to continue the movement of the test sheets 27 from the sensing station into the receiving hopper 32 (see FIG. 1).

FIG. 2 illustrates the relationship of the photocells 51–54 to the individual answer areas on a typical test sheet 27A. The test sheet 27A is provided with a plurality of columns 61, 62, 63 and 64 of answer locations. A typical answer location 65 includes four individual answer areas 71, 72, 73 and 74 which may be identified on the answer sheet simply in the form of printed circles, squares, or other geometrical configurations. The individual answer areas in each answer location, such as the answer location 65, extend transversely of the answer column and are arranged in predetermined alignment with the answer areas at the answer locations in adjacent columns. In the test sheet 27A, the arrangement is a linear one, the answer locations and answer areas thereof being directly aligned with adjacent answer locations in a line, in each instance, extending across the sheet 27 in a direction normal to the side edges of the sheet. Several of the individual answer areas of the test sheet 27A are shown as being marked over to indicate correct answers to individual test questions.

FIG. 4 illustrates the mask 35 that is used in scoring the test sheets such as the test sheet 27A. The mask or master sheet 35 is provided with a plurality of columns 81, 82, 83 and 84 corresponding to columns 61, 62, 63 and 64, respectively, of the test sheet. Each of these columns 81–84 includes a plurality of answer locations, such as the answer location 85 in the top row, column 81. Furthermore, each answer location such as the answer location 85 includes four individual answer areas which are arranged in essentially the same pattern as the answer areas of the test sheets. Of the four answer areas 91, 92, 93 and 94 in the answer location 85, however, only one is punched out or otherwise made transparent in the master sheet 35. That is, the answer area 94 comprises an aperture in the mask 35, the answer areas 91–93 in the same grouping not being punched out. Consequently, the answer location 85 the answer area 94 indicates the one correct answer out of four possible answers. The illustrated mask or master sheet 35 provides for only one aperture for each answer location; however, it should be understood that two or more apertures could be formed in a given answer location depending upon the nature of the test and the correct answer to a given question. Furthermore, the correct answers can be differentiated from incorrect answers, in the master sheet 35, by means other than the punching out of individual apertures. Thus, the entire mask 35 could be made transparent and only the correct answer areas such as the answer area 94 could be marked or otherwise altered in order to render them opaque. In the present embodiment, however, effective operation depends upon a mask in which a transparent area indicates a correct answer.

The electrical circuit for the test scoring machine is best illustrated in FIG. 5, although some portions of the electrical actuation mechanism are also shown in FIGS. 1, 3 and 6. Thus, the test scoring machine 20 includes a commutator 101 that is mounted on the rotatable drum 24 and which rotates with the drum. The commutator 101 comprises a plurality of individual conductive segments 102, the number of conductive segments being equal to the number of answer locations in each column of the test scoring sheets 27. Of course, this is also equal to the number of answer locations in each column of the master sheet 35. Each of the conductive segments 102 is electrically insulated from the adjacent segments, but all of the conductive segments are electrically connected to a slip ring 103 at the center of the commutator. The slip ring 103, in turn, is electrically connected through a brush 104 to a power supply 105. The commutator 101 further includes four individual brushes 111, 112, 113 and 114 which are individually electrically connected to the photocells 51, 52, 53 and 54, respectively. Assuming that the photocells comprise diodes, as noted hereinabove, the brushes 111–114 may, in each instance, be connected to the cathode of the associated photocell. The anode of each photocell is connected to the corresponding electrodes of the other photocells and to an amplifier 115. This cathode-anode relation can of course be reversed, depending on the polarity of the input signal required for amplifier 115. The power supply 105 may also be coupled to the amplifier 115 to afford a suitable source of operating potential for the amplifier. The output of the amplifier 115 is electrically connected to the printing counter 33. In addition, the counter 33 may be connected to the power supply 105 through a cam-actuated reset switch 116. The operating cam for the switch 116 is preferably operated in synchronism with rotation of the commutator 101, and hence in synchronism with rotation of the drum 24 (see FIG. 1). It will be understood that the mask 35 and the test sheet 27A are not spaced from each other, in actual practice, in the manner shown in FIG. 5, but rather are in contact with each other (see FIG. 1).

In a given sensing operation, as noted hereinabove, an individual test sheet such as the test sheet 27A is first fed from the magazine 26 (see FIG. 1) and into the sensing station 29. During the initial feeding movement, the drum 24 rotates. However, at this time the individual commutator brushes 111–114 engage the major insulator member 117 of the commutator disc 101. Consequently, the electrical circuit for each of the diodes 51–52 (see FIG. 5) remains open until such time as the conductive segments 102 of the commutator are engaged by the brushes 111–114. During this initial in-feed portion of an operating cycle, the switch 116 may be closed for a predetermined interval to apply a reset signal to the counter 33, returning the counter to its normal or "zero" operating condition.

With the continued movement of the test sheet 27A into the sensing station, the first horizontal row of answer locations, such as the answer location 65, comes into general alignment with the four photocells 51–54. Actually, the answer location 65 comes into alignment with the photocell 51 before any of the other answer locations in the first row, but in the other columns, become aligned with their associated photocells. Simultaneously, the rotation of the drum 24 brings the first answer location 85 of the mask 35 into alignment with the photocell 51. Moreover, at this particular instant the brush 111 also engages the first conductive segment 102 on the commutator disc 101. Thus, at this time the photocell 51 is energized, whereas before it had not been connected in a complete operating circuit.

If the correct answer area 74 on the test sheet 27A (FIG. 2) has been blacked out, this area corresponding to the answer area 94 in the mask 35 (FIG. 4) that is transparent, the photocell 51 cannot be illuminated from the lamp 41. This condition is illustrated in FIG. 5, which shows, in exaggerated detail, the marked answer area 74 aligned with the aperture 94. Under these conditions, the normal high impedance of the photodiode 51 remains unchanged, and no substantial signal is applied to the amplifier 115. On the other hand, if the student or other person who has marked the test sheet 27A has not marked over the correct answer area 74, the photocell 51 is illuminated through the generally translucent answer sheet 27A. Under these circumstances, a pulse signal is applied to the amplifier 115, is amplified therein, and is applied to the counter 33. This action takes place successively for each answer location in the first horizontal row of the answer locations on the test sheet 27A. Because the photocells 51–54 are staggered in their alignment with respect to the answer locations in the test sheet columns, four individual pulses can be generated by the photodiodes and supplied to the amplifier 115 if there are four instances, in the first row of the test sheet, in which the student has failed to mark the correct answer. When the answer location in the first row of column 64 passes its position of alignment with photocell 54, the second answer location in column 61 is immediately presented to photodiode 51. Thus, it is seen that the test scoring machine 20 continuously and rapidly scans all of the individual answer areas in the four cloumns 61–64 of the test sheet. If the photocells 61–64 were not staggered, in relation to the positions of the answer locations in the top row and in each succeeding row on the test sheet, it would probably be necessary to provide a much more elaborate control arrangement for energizing the photocells in sequence than is afforded by the simple commutator 101. Otherwise, four wrong answer signals might well be generated simultaneously by the four photodiodes, with the result that only one distinguishable pulse would be applied to the amplifier 115 (FIG. 5) and only one wrong answer would be counted by the counter 33 instead of four. Thus, the staggered arrangement of the photocells makes possible a substantial simplification of their energizing circuits. In fact, if the photocells can be staggered to an extent sufficient to eliminate any overlapping therebetween, the commutator can be omitted. This is not always desirable, however, because it may well require the separation of answer locations, in a vertical direction on the test sheets, to an extent such that the total number of answers which can be recorded on a test sheet of reasonable size is unduly restricted.

The specific construction of the amplifier 115 is not critical with respect to the present invention, and any amplifier circuit having a relatively short response time may be utilized for this purpose. In fact, the operating characteristics of the amplfier will usually be determined primarily by the requirements of the counting and printing device 33, particularly with respect to the amplitude of the input signal required to actuate the counter. By the same token, the printing counter 33 may be of conventional construction, and devices suitable for this element of the present invention are commercially available. Furthermore, it is not essential that a single power supply 105 be provided to actuate the photocells, the amplifier, and the counter; separate power supplies may be employed if desired. The printing operation may be initiated mechanically by means of a suitable cam linkage or other linkage from the rotating drum 24 to the printing counter 33. On the other hand, if the counter is of the electrically actuated kind, insofar as a printing operation is concerned, an additional cam-actuated switch similar to the switch 116 may be connected in the operating circuit of the counter which controls the printing operation so that the test score is printed on each test paper as it leaves the sensing station 29 (see FIG. 1). The printing counter 33 may be of the count-down type; that is, it may normally be set for a total answer figure such as 100 and may count down from that total figure in response to each input pulse indicative of an incorrect answer. On the other hand, if desired, a counter may be utilized which simply totals the number of incorrect answers and prints this total figure on each test sheet.

FIG. 7 illustrates an alternate arrangement for the alignment of the answer areas on the test sheets with respect to the photocells. As shown therein, the test scoring machine may include four individual photocells 51B, 52B, 53B and 54B. These photocells correspond to the photodiodes 51–54 of FIG. 2, and can be used in the same electrical circuit, but are not aligned in staggered array relative to each other. Instead, the arrangement of the photocells in FIG. 7 is one of direct linear alignment.

In the arrangement of FIG. 7, however, the test sheet 27B is constructed differently from the test sheet 27A (FIG. 2) in order to provide the desired staggered alignment of individual answer locations relative to the photocells. Thus, the test sheet 27B comprises four vertical columns 61B, 62B, 63B and 64B of answer locations, the uppermost answer locations being designated by the reference numerals 65B, 66B, 67B and 68B. The individual answer areas in answer location 65B are not horizontally aligned with the answer areas in the answer location 66B at the top of the second column. Instead, these two answer locations 65B and 66B are staggered in substantially the same way that the photocells were staggered in the arrangement of FIG. 2. This offset relationship is carried out across the test sheet 27B in a consistent manner so that only one answer location on the test sheet 27B is effectively aligned with a photocell at any given time. It is thus seen that the construction illustrated in FIG. 7, with respect to the test sheet and its relation to the sensing photocells, provides substantially the same functional effect as the arrangement of FIG. 2. Of course, it is not essential that there be four columns of answer locations or that each answer location include four answer areas, the particular number of columns and of answer areas being determined only by the requirements of the test being given. This is equally true with respect to the number of rows of answer locations on the test sheet.

In the foregoing description of the embodiment of FIGS. 1–6, it has been assumed that each correct answer usually includes only one item; that it, a correct answer is indicated by marking out just one of the answer areas in each answer location on the test sheet. With this kind of test sheet, some students or other persons taking an examination might decide to attempt to mark more than one answer area in a given test location. This is particularly true if they were aware of the fact that machine grading would be employed. Multiple-marking of this kind could be detected quite easily by visual inspection if carried out with any consistency by the person taking the examination. On the other hand, it may be desirable to use the machine itself to check for sporadic attempts of this kind to confuse the scoring operation. Moreover, in some examinations it may be desirable to provide a score which penalizes the person taking the examination for guessing, by affording a total-right minus total-wrong or similar score.

The embodiment of FIGS. 1–6 can accomplish both of these objectives simply by running the test sheets through the machine four times instead of once. The first scoring operation would be essentially as described hereinabove, and would thus determine the number of instances in which the person taking the examination failed to mark out the correct answer. On a second run of the machine, the original correct-answer mask 35 could be replaced by a different mask in which the transparent areas would each correspond to one of the three incorrect answer areas in each answer location. In this operation the machine would provide a count of any wrong markings in these particular answer areas. This procedure would be followed with two more masks in order to cover all potential answer areas on the tests sheets. Thus, the total count afforded by the machine on the last three runs would indicate the number of instances in which guessing occurred or in which multiple markings were made. These data could then be used by the instructor in the usual manner to penalize the student for guessing or for multiple marking where only one correct answer was desired. Because the test scoring machine operates quite rapidly, the total time required would still be far less than entailed in manual scoring, whether assisted by some kind of mask or otherwise.

One difficulty in a photoelectric mask scoring arrangement of the kind entailed in the test scoring machine 20 pertains to the alignment of the mask 35 with the test sheet 27A as the test sheet traverses the scanning station 29. If there is any substantial misalignment between the test sheet and the mask, some of the photocells may be illuminated at times when they should not be, or illumination of the photocells may not be accomplished when they should be illuminated. Misalignment can result from a minor shift in the printing of the answer areas on the test sheet. It can also be caused by minor variations in preparation of the mask, particularly where the mask comprises a partially pre-punched sheet of paper or the like and final punching is effected by the instructor or other person who is to score the test sheets. This problem can be alleviated to some extent by making the mask holes substantially smaller than the answer areas which are to be marked over by the students, and this technique is employed in the construction shown in FIGS. 1–6 and also in the variation illustrated in FIG. 7. However, this may result in the necessity of forming extremely small apertures in the mask, particularly where a large number of answers are to be recorded upon a test sheet. Under these circumstances, it may become impractical to employ pre-punched paper masks because it may be difficult to prevent enlargement of the mask apertures beyond the desired extremely small size when the mask is punched with the correct answers.

This difficulty is overcome by adopting the preferred test sheet construction illustrated in FIG. 8. The test sheet 27C shown therein is in many respects substantially similar to the test sheet 27A of FIG. 2 and comprises a sheet of ordinary inexpensive paper upon which a plurality of columns of answer locations are printed, only the first two columns 61C and 62C being shown in FIG. 8. Furthermore, the individual answer locations, such as the answer location 65C at the top of column 61C, each include a plurality of individual answer areas. Thus, the answer location 65C includes four answer areas 71C, 72C, 73C and 74C. In this instance, however, the individual answer areas are not simply identified by printed circles, squares, or the like. Instead, the answer location 65C comprises a broad dark border 121 which completely encompasses and isolates each of the individual undarkened answer areas 71C–74C. Preferably, the border 121 is printed in solid black ink, although some other color which would screen out any light to which the photocells are sensitive would also be satisfactory. Furthermore, the individual answer areas 71C–74C are made substantially smaller than the mask apertures.

The test sheet construction illustrated in FIG. 8 affords a number of advantages as compared with more conventional arrangements. In the first place, the individual answer areas can be made of an ideal size and shape. In particular, they may be made relatively small so that darkening of the answer areas can be accomplished more quickly and efficiently by the person taking the test. This results in more accurate scoring of the tests sheets. With the test sheet 27C, a substantially larger mask aperture can be employed, so that this aspect of the system is less critical. Finally, the test sheet 27C provides adequate compensation for any reasonable amount of misalignment of the mask with respect to the test sheet, and vice versa, during the test scoring operation. Of course, the construction for the test sheet 27C illustrated in FIG. 8 can be adopted equally effectively with the staggered alignment of answer locations used in connection with the test sheet 27B of FIG. 7.

FIGS. 9–11 illustrate another embodiment of the invention which is utilized to preclude scoring errors which may arise from misalignment of the test sheets, relative to the master sheet or mask, as the test sheets are fed through the machine. This embodiment is also effective to interrupt operation of the scoring machine whenever more than one test paper is fed through the machine.

The test scoring machine 140 that is illustrated in schematic form in FIG. 9 is essentially similar to the scoring machine 20 of FIGS. 1–6. Thus, the machine comprises a rotatable drum 24 that is driven in synchronism with a sheet feeding mechanism, the sheet feeding mechanism being effective to feed individual test sheets such as the test sheet 27D into a scanning station 29 adjacent the drum. The drum 24 is provided with means for mounting a mask 35D thereon, and a suitable light source, here represented by the lamp 41, is mounted within the drum. Furthermore, the machine 140 is also equipped with a commutator 101 that rotates in synchronism with the drum 24. As before, the machine is provided with a plurality of photocells, only the first photocell 51 being illustrated in FIG. 2.

The electrical circuit of the machine 140 is also substantially similar to that shown hereinabove, particularly in FIG. 5. It comprises the amplifier 115 which is coupled, at its input circuit, to the photocells, as indicated by the illustrated electrical connection to the cell 51. The output stage of the amplifier 115 is coupled to a printing counter 33, or other suitable counting device. The power supply for the amplifier 115 and for the photocells is again designated by the reference numeral 105. Moreover, the power supply may be connected to the counter 33 through a cam-actuated reset switch 116 to provide a means for resetting the counter.

In this instance, however, the electrical circuit includes a double-pole double-throw switch 141 having a first section 142 connected in series in the operating circuit from the amplifier 115 to the counter 33. The other section 143 of the switch 141 is provided with one terminal which is left open and a second terminal which is grounded. The main terminal of switch section 143 is connected in series in the operating circuit of a coil 144 that is combined with a second coil 145 in a differential relay 146. The coil 144 is also connected to the power supply 105. The coil 145, on the other hand, is grounded at one terminal and the other terminal is connected back to the switch section 142. The switch 141 is preferably arranged for actuation by a cam or other mechanical linkage, as indicated by the cam 147, that is operated in synchronism with rotation of the drum 24.

The test sheet 27D illustrated in FIG. 10 may be generally similar to any of the test sheets described hereinabove. Thus, the test sheet 27D is provided with the usual columns of answer locations, each answer location including a plurality of answer areas which may be individually blackened or otherwise marked to indicate an answer. The test sheet 27D, however, is provided with an alignment area 151 that is identified, on the test sheet, by a broad dark border 152 encompassing the alignment area. In the test sheet 27D, the alignment area 151 is disposed above the initial column 61D of answer locations; however, the test sheet may be provided with a plurality of alignment areas if desired, and these may be aligned with the individual answer location columns. The mask 35D used in this embodiment of the invention, which is shown in FIG. 11, is provided with an alignment-indicator area or aperture 153 which is in the same relative position on the mask, with respect to the answer locations, as the alignment area 151 on the test sheet.

When the scoring machine 140 of FIG. 9 is placed in operation, the actual test scoring operation proceeds as outlined hereinabove with respect to the embodiments of FIGS. 1–6. That is, the individual photocells such as the photocell 51 effectively compare the test answer apertures in the mask 35D with the darkened answer areas on the test sheets, such as the test sheet 27D. The number of wrong answers are counted by the counter 33 to afford a test score, and resetting of the counter after each cycle of operation is accomplished by means of the reset switch 116.

In this embodiment of the invention, however, the alignment of the test sheet with respect to the mask is checked by the machine itself during the initial portion of each sensing cycle. Thus, at a given point in each test cycle, as the test sheet 27D is fed into the scanning station 29, the cam 147 momentarily actuates the switch 141 from its normal position, as shown in FIG. 9, to its alternate or alignment checking position. When this is done, the operating circuit for the coil 144 of the relay 146 is energized, since this circuit is now completed through section 143 of the switch 141. Energization of the coil 144 tends to actuate the relay contacts 148, which may be connected in the main motor drive circuit for the test scoring machine 140 or may be connected to an alarm device. The actuation of the switch 141 is adjusted to coincide with the movement of the mask 35D into a position in which the alignment-indicator aperture 153 is interposed between the light source 41 and the photocell 51. If the alignment area 151 on the test sheet 27D is also accurately aligned with the light source and the photocell, the photocell is energized and applies a control signal to the amplifier 115. This control signal is amplified and supplied to the other coil 145 of the differential relay 146. The two coils 145 and 146 oppose each other, with respect to their effect upon the relay contacts 148. Consequently, the relay may be adjusted to maintain the contacts 148 in their normal closed position, as shown in FIG. 9, whenever a signal of given amplitude is received from the amplifier 115, upon actuation of the cam-controlled switch 141.

If the test sheet 27D is not accurately aligned with the mask 35D, as the test sheet is fed into the sensing station 29, the heavy border 152 encompassing the alignment area 151 prevents illumination of the photocell 51 in the manner described hereinabove. Consequently, the output signal from the amplifier 115 to the relay coil 145 is at least substantially reduced in amplitude, and may be effectively cut off. This being the case, the energization of the main relay coil 144 is effective to open the relay contacts 148, which may interrupt operation of the machine or sound an alarm, depending upon the manner in which the relay contacts are connected in the operating circuit of the scoring machine. By the same token, in the event that two test sheets are fed simultaneously into the scanning station 29, the normal amount of light reaching the photocell 51 is substantially reduced, since the light from the lamp 41 must now pass through two sheets of paper instead of one. The operating circuit can be adjusted to permit the relay 146 to trip under these conditions, again interrupting operation of the machine or otherwise warning the operator that an incorrect scoring operation is taking place.

FIGS. 12 and 13 illustrate yet another embodiment of the invention which in many respects is similar to those described hereinabove but in which the arrangement of the light source and the photocells at the scanning station is somewhat different and the printing device used to print the test score on the test papers is also substantially different. In these figures, many of the structural details which are common to the previously described embodiments of the invention have been omitted because they are unnecessary to an understanding of this embodiment of the invention.

The test scoring machine 220 illustrated in FIGS. 12 and 13 comprises a rotary drum 224 which is generally similar to the drum 24 described hereinabove. The drum 224 may be constructed from sheet metal but is provided with a transparent section 234 and suitable means for mounting a mask 235 on this section of the drum. In the drum 224, and also in the drum 24 of the earlier embodiments, the transparent section 234 may be fabricated from a transparent plastic, this construction being preferred because it provides the best support for a lightweight flexible mask, and it is usually desirable to make the mask from paper in order to permit convenient and economical replacement for different scoring operations. The drum 224 is journalled in suitable bearings on a stationary shaft 245 and may be provided with a suitable pulley 225 or the like to afford a convenient means for rotating the drum.

In the test scoring machine 220, the shaft 245 extends completely across the drum 224, and a plurality of fixed support members 246 are suspended from the shaft within the interior of the drum. The support members 246 are utilized to mount the individual photocells 251, 252, 253 and 254 within the interior of the drum (see FIG. 13). Except for their position, the photocells 251-254 are generally similar to the photocells 51-54 of the previously described embodiments. The photocells 251-254 are located at the scanning station 229 of the scoring machine 220 and are individually aligned with a light source comprising the four individual lamps 241, 242, 243 and 244. Of course, a single elongated lamp or other suitable light source may be utilized instead of the lamps 241-244 if desired.

As before, the scoring machine 220 includes a storage magazine 26 from which the test sheets 27 are fed by suitable sheet feeder means including the feed roller 28. An impression roller 248 is also located at the scanning station 229; this impression roller may also be utilized as a feed roller to continue movement of the test sheets 27 from the scanning station into the receiving hopper or magazine 32 (FIG. 12).

The electrical control circuit for the embodiment of FIGS. 12 and 13 may be essentially the same as the control circuits of FIGS. 5 or 9. In this instance, however, the control circuit 305 is mounted within the drum 224, preferably being mounted on and positioned above the stationary shaft 245 as illustrated in FIG. 13. The control circuit 305 is shown only schematically in FIG. 12 and is displaced from the preferred position in order to avoid interfering with illustration of other components of the scoring machine within the drum. As before, the machine includes a commutator 101 that is mounted on the drum 224 for rotation therewith. The photocells 251-254 are connected to individual brushes which engage the segments of the commutator, and the commutator is energized by suitable means such as the slip ring 103 and the brush 104.

In this embodiment of the invention, however, the electrically actuated printing counter 233 is mounted on the drum 224. Electrical connections to the counter 233 from the control circuit 305 are provided by a pair of slip rings 260 and 261. Thus, the printer-counter 233 can be connected to the control circuit 305 in a circuit essentially similar to those described hereinabove for the counting device 33. The printing mechanism of the device 233 is generally indicated by the reference numeral 262, and the device may be provided with an inked ribbon 263. However, if desired other provisions may be made for inking of the type wheels or similar printing elements of the device 233.

The basic operation of the test scoring machine 220 is essentially similar to that described hereinabove in connection with the other embodiments of the invention. The locations of the photocells and the light source are reversed, but this does not materially affect operation of the photocells in sensing incorrect answers. In this embodiment, on the other hand, the printing of the test score upon a given test sheet occurs immediately upon completion of the scoring operation, since the printing counter 233 is located at the trailing edge of the mask 235 in position to imprint the trailing edge of each test scoring sheet as it enters the scanning station 229. Printing is effected on the trailing edge of the test sheet as the sheet passes between the printing elements 262 of the counter and the impression roller 248. Furthermore, this arrangement has the advantage that virtually all of the components required to convert a conventional duplicating machine into a test scoring machine are mounted inside the drum, the only additional element not inside the drum being the light source 241-244. Consequently, this construction makes it possible to use the test scoring machine as a duplicator and as a test scoring machine, the conversion being effected simply by replacement of the drum and the associated shaft 245.

FIGS. 14 and 15, considered together, illustrate modifications which may be effected in the present invention to permit direct scoring on a "right minus wrong" basis while retaining a photoelectric sensing system. FIG. 14 illustrates a mask 335 and a test scoring sheet 327 in alignment with each other, as they would be for a scoring operation, and in alignment with the photoelectric sensing devices utilized in this embodiment of the invention. The mask 335 is somewhat different in construction from the masks described hereinabove, but may be mounted upon a drum such as the drum 34 (FIG. 1), the mechanical function of the mask being the same as in the other embodiments of the invention. The test sheet 327, on the other hand, is essentially similar to the test sheet 27C illustrated in FIG. 8. Instead of using only four photoelectric pick-up devices, one for each column of answers, the embodiment of FIG. 14 employs an individual photocell for each answer area transversely of the test sheet 327. Thus, the first column 361 in the answer sheet 327 includes a plurality of answer locations such as the answer location 365. Furthermore, each answer location in this column includes four individual answer areas 371, 372, 373 and 374. As in the test sheet illustrated in FIG. 8, the individual answer areas are preferably outlined by a broad dark border which completely encompasses and isolates each answer area. In alignment with the answer sheet column 361 there are provided four photoelectric sensing devices 331, 332, 333 and 334. Thus, by comparison with the arrangement shown in FIG. 2, the four photocells 331-334 replace the single photoelectric sensing device 51 shown therein. Similarly, the second column 362 on the answer sheet is aligned with four photocells 341, 342, 343 and 344, the third column 363 is sensed by four additional photocells 351, 352, 353 and 354, and final column 364 of the test sheet is aligned with four photocells 381, 382, 383 and 384. The staggered arrangement of the photocells is maintained as before, except that the photocells are staggered by groups instead of individually.

The mask 335, unlike the masks described hereinabove, is not completely opaque at any of the individual answer areas. Thus, at each answer area there is provided a relatively small answer-position aperture such as the aperture 336 that is aligned with the test sheet answer area 371. The individual answer-position apertures, such as the aperture 336, however, do not indicate a correct answer. Instead, they simply indicate a possible answer-indicator position. Furthermore, the mask aperture such as the aperture 336 are made substantially smaller than the basic test sheet answer areas such as the area 371.

To indicate a correct answer location, substantially larger answer-indicator apertures such as the aperture 337 in the mask 335 are provided. The answer-indicator aperture 337 may be approximately the same size as the corresponding test sheet answer area 374, or may be somewhat larger or somewhat smaller. There is a quite substantial difference in size, however, between the answer-indicating aperture 337 and the answer-position aperture 336 of the mask. It is the provision of this dual-aperture construction for the mask which makes possible achievement of a direct right-minus-wrong result from a single scoring operation, as described hereinafter.

Before considering the electrical circuit for the embodiment of FIGS. 14 and 15, it is desirable to consider the number of different possible combinations of darkened and undarkened answer areas on the test sheet 327 with the small and large apertures in the mask 335 of FIG. 14. For any given test sheet answer location, such as the answer location 365, there are eight possible combinations as follows:

A. A correct answer, with only one answer area darkened on the test sheet 327 in the answer location 365, this darkened answer area being aligned with the large aperture in the corresponding answer location in the mask 335. In FIG. 14, this would entail a darkening of the answer area 374 aligned with the aperture 337 of the mask.

B. A complete omission of any answer, right or wrong, all of the answer areas being left blank.

C. An incorrect answer, entailing darkening of areas not aligned with the correct mask aperture (the large aperture), but only one answer area on the test sheet darkened. For example, this would result from darkening of any one of answer areas 371-373 in answer location 361 of the test sheet 327.

D. An incorrect answer with two answer areas on the test sheet darkened, these answer areas both being different from the correct enlarged answer-indicator aperture on the mask.

E. An incorrect answer with all three of the wrong answer areas darkened.

F. An incorrect answer, with the correct answer area darkened but with an incorrect answer area also darkened. In answer location 365, this would result from the darkening of answer area 374 together with any one of the three incorrect answer areas 371-373.

G. An incorrect answer, with the correct answer area and two additional answer areas darkened on the test sheet.

H. An incorrect answer with all of the answer areas at a given answer location darkened.

For further assistance in understanding the analysis circuit of FIG. 15, consideration may be given to the signal values produced by the photocells under the various possible conditions outlined above. In the first place, the maximum deviation in the output from any one of the photocells of FIG. 14 occurs when that photocell is aligned with an undarkened answer area in the test sheet 327 and with one of the large answer-indicator apertures in the mask. By way of example, this would occur if the answer area 374 were not darkened by the person taking the test, this answer area being aligned with the enlarged aperture 337 in the mask 335. This maximum signal value, which could be a maximum or minimum current or a maximum or minimum voltage depending on the kind of photoelectric sensing device employed, may be assigned an arbitrary value for analysis purposes. In the following discussion, it is assumed that this is a signal value of eight.

The next possible condition is one in which the photocell is aligned with a darkened answer area and with a large answer-indicator aperture in the mask. With this arrangement, the photocell produces a substantially smaller signal output, which depends to some extent upon the nature of the marking pencils or other devices employed, the paper utilized, and other related factors. Reasonable control of these factors can be exercised to produce a relatively consistent and substantial difference in the signal output from the photocell as compared with the initial condition set forth in the preceding paragraph. In the following discussion, and based upon practical experience, it is assumed that the signal output under these conditions is approximately one-half the amplitude of the maximum signal, producing a signal value of four.

The next possible condition results from the alignment of a photocell with an undarkened answer area on the test sheet 327 and with one of the small answer location apertures such as the aperture 336. With this arrangement, it is apparent that substantially less illumination reaches the photocell, as compared to the first example in which the photocell is aligned with a large mask aperture such as the aperture 337. The size of the aperture 336 is preferably made such as to afford a signal amplitude which is approximately the same as in the case of a correct answer. That is, the aperture 336 may be made small enough to afford a signal output that is approximately equal to the output of one of the photocells when it is aligned with a large mask aperture but has a darkened test sheet answer area interposed between it and the large mask aperture. Thus, this third photocell condition may also be considered to result in an output signal having an amplitude of four.

Finally, the photocell may be aligned with a darkened answer area on the test sheet and with one of the small location apertures such as the aperture 336 in the mask. The signal ratio should be about the same as between the first two photocell conditions described above. Accordingly, the signal amplitude in this instance is a value of approximately two.

The possible photocell signal outputs may be correlated with the possible combinations A–H of mask apertures and test sheet markings listed hereinabove, producing the following signal conditions for each of the eight possible answer conditions at any given answer location:

A. Correct answer _____ 4–4–4–4
B. No answer _____ 8–4–4–4
C. Incorrect answer _____ 8–4–4–2
D. Incorrect answer _____ 8–4–2–2
E. Incorrect answer _____ 8–2–2–2
F. Incorrect answer _____ 4–4–4–2
G. Incorrect answer _____ 4–4–2–2
H. Incorrect answer _____ 4–2–2–2

From the foregoing, it may be seen that a correct answer is characterized by essentially equal signal outputs from all four sensing devices, these signal outputs having an assumed value in this instance of four. Failure to answer a question results in signal outputs from three of the photocells that are the same as if a correct answer were present, but a fourth photocell produces a maximum signal output, here given an arbitrary value of eight. Each of the incorrect answers is characterized by a signal output from at least one photocell that is a minimum, in this instance a signal having an amplitude of two. These characteristics are utilized in analyzing the output signals from the photocells to produce the desired right-minus-wrong scoring, a typical system being illustrated in FIG. 15.

FIG. 15 illustrates, in block diagram form, an operating circuit which may be utilized to analyze the output signals from the photocells, in the arrangement of FIG. 14, to produce an automatic right-minus-wrong score. It should be understood that FIG. 15 represents only one of a variety of different circuit arrangements which could be utilized for this purpose and is presented solely by way of an example of circuit of this kind. As shown in FIG. 15, each of the photocells is energized by an appropriate circuit connecting the photocell to the commutator 101. The first bank of cells 331–334 are all energized simultaneously, and this is true of the other three banks of photoelectric sensing devices. As before, the commutator is connected to a suitable power supply 305.

The output circuits of the sensing devices 331, 332, 333 and 334 are individually coupled to four "and" gates 401, 402, 403 and 404, respectively. Furthermore, a similar individual coupling circuit arrangement is utilized to connect each of the other photocells, individually, to one of the "and" gates 401–404. The second input circuit for each of the gates 401–404 is connected to the power supply 305. The photocells 331, 332, 333 and 334 are also individually coupled to four additional "and" gates 411, 412, 413, and 414, respectively. A corresponding connection is made from the output circuit of each of the other photocells in the system to one input circuit in each of the gate devices 411–414. The second input circuit of each of the gates 411–414 is individually connected to the output of the corresponding one of the "and" gates 401–404. The output circuits of the gate devices 411–414, on the other hand, are connected to an "or" gate 415. The "or" gate 415 is provided with a second input circuit that is connected back to the commutator 101 in an arrangement which provides an input pulse to the gate 415 for each answer-reading operation, as explained more fully hereinafter.

The circuit arrangement of FIG. 15 further includes four "inhibit" circuits 421–424. Each of the "inhibit" circuits is individually connected to the output circuit of one of the "and" gates 401–404. A further input circuit is provided for each of the "inhibit" devices 421–424, connecting the circuit to the commutator 101 in order to apply an input signal to the circuit for each reading operation. The outputs of the circuits 421–424 are connected to a preset counter 417 through a time delay circuit 418. The counter 417 is also coupled to the output of the "or" gate 415. In addition, the outputs of circuits 421–424 are connected to an additional input circuit for the "or" gate 415.

The "and" gate 401 may be substantially conventional in construction and requires two input signals in order to produce an output signal. Furthermore, the gate 401 is constructed, in known manner, to require a signal amplitude in excess of a given minimum at either of its two input circuits, and particularly at that input circuit which is coupled to the photocells 331, 341, 351 and 381. A similar construction is used for the corresponding "and" gates 402–404. Based on the signal amplitude data set forth hereinabove, each of the gates 401–404 is constructed to provide an output signal only in the presence of an input signal, from one of the photocells, that is substantially in excess of the minimum amplitude signals from the photocells. In other words, the "and" gate 401 produces an output signal only when the signal applied thereto from one of the photocells has an amplitude of more than two. On the other hand, the threshold amplitude for the "and" gate 401 is kept well below the next significant output signal amplitude from the photocells, this being the amplitude of the signals indicative of a correct answer. That is, the operating threshold for the gate 401 must be below a signal amplitude of four, based on the signal values given hereinabove. Typically, the operating threshold of the "and" gate 401 would be set at a level of about two and one-half to three. A similar construction is used for the gates 402–404.

The "and" gate 411 is essentially similar to the gate 401, in its constructon. In this instance, however, the circuit parameters of the device 411 are made such that an input signal having an amplitude approximately equal to the maximum output from the photocells is required in order to produce an output signal from the gate. Based on the signal amplitudes set forth hereinabove, the threshold for the "and" gate 411 is established at an amplitude of about seven, so that the gate 411 does not produce an output signal unless a maximum signal is applied thereto from one of the photocells 331, 341, 351 or 381. Of course, since the gate 411 is a typical "and" device, no output signal is produced thereby unless there is an output signal from the gate 401, but there will always be an output signal from the gate 401 in those instances where the output signal from the photocells is a maximum. The gates 412, 413 and 414 are essentially similar in construction to gate 411. Consequently, output signals are applied to the "or" gate 415 only when a maximum signal, corresponding to illumination of a photocell through one of the enlarged answer-indicator apertures in the mask and through an undarkened answer area on the test sheet, is produced. The "or" gate 415 may also be substantially conventional in construction, but comprises a circuit which is rendered conductive or otherwise conditioned to produce an output signal only in the presence of an input signal from any one of a plurality of sources. In this instance, a pulse signal applied to the "or" gate 415 from the commutator 101, as noted hereinabove, is translated through the gate and supplied to the counter 417 whenever an output signal is produced by and effectively supplied to the "or" gate from one of the "and" gates 411–414.

As noted hereinabove, an output signal is produced by each of the "and" gates 401–404 whenever the input signals applied to its gates from the photocells exceed the minimum signal amplitude, hereinabove taken as an amplitude value of two. The output signals from these gates, in addition to being applied to gates 411–414, are supplied to the "inhibit" circuits 421–424, respectively. The "inhibit" circuit 421 is conditioned to apply a pulse signal from the commutator to the counter 417, through the time delay circuit 418, unless an input signal is applied to the circuit 421 from the gate 401. That is, an output signal is produced by the "inhibit" circuit 421 only when there is a minimum amplitude signal produced by one or more photocells, since any signal of greater amplitude produced by the photocells results in the application of an input signal to the "inhibit" circuit from the "and" gate 401. This action is duplicated, in the "inhibit" circuits 422–424, for the other photocells.

The output signals from the "inhibit" circuits 421–424 are also applied to the "or" gate 415. Thus, whenever an output signal is produced by one of the "inhibit" circuits, the "or" gate 415 is automatically actuated to produce an output pulse that is supplied to the counter 417. It is thus seen that the circuit 415 supplies an actuating pulse to the preset counter 417 whenever either a maximum (eight amplitude) signal or a minimum (two amplitude) signal, or both, are developed by the photocells. Furthermore, a pulse signal is supplied to the counter through the time delay circuit 418, from the gate 416, whenever a minimum amplitude signal is developed by any of the photocells.

In a given test, where the maximum score is 100, the preset counter 417 is set to the maximum possible test score. During the scoring operation, each time a correct answer (example A above) is encountered, four substantially equal output signals are produced by the photocells. These signals are of sufficient amplitude to actuate each of the gates 401–404, producing output signals that prevent application of a counting pulse to the counter through the operating circuits comprising any of the "inhibit" circuits 421–424 and the time delay circuit 418. By the same token, these signals are small enough in amplitude so that no output signal is developed in the alternate analyzing circuit comprising the "and" gates 411–414 and the "or" gate 415. Consequently, on a correct answer, no actuating signal is supplied to the counter 417 and the preset count is not reduced.

In those instances in which the person taking the test has not marked any answer area, at a given answer location, a maximum (eight amplitude) signal is produced by one of the photocells and median (four amplitude) signals are produced by the other three cells (see example B above). The maximum amplitude signal effectively actuates one of the "inhibit" circuits 421–424 to prevent application of an actuating signal to the counter through the circuit comprising these devices and the time delay circuit 418. However, the maximum amplitude signal is effective to actuate one of the "and" gates 411–414 to produce, in the circuit 415, a pulse signal that is applied to the counter 417, reducing the total count in the counter by one. This is the normal reduction in the count occasioned by failure to answer a question.

Finally, whenever a minimum amplitude signal appears in the output from any of the photocells (examples C–H) at least one of the "inhibit" circuits 421–424 is actuated to produce an output signal. This output signal is supplied to the gate 415 and results in the application of a countdown signal to the counter 417. The same signal is also translated through the time delay circuit 418 and applied to the counter, after the signal from circuit 415. Consequently, the total count in the counter 417 is reduced by two, the desired result when the person taking the test has guessed and marked an answer incorrectly.

From the foregoing description, it is apparent that the mask 335, with its two different sizes of apertures, makes it possible to effect direct right-minus-wrong scoring using only one sensing apparatus and with only one run of the test sheets through the scoring machine. To some extent, accurate operation of the scoring machine is dependent upon accurate punching of the relatively large answer-indicator apertures such as the aperture 337. The mask may be pre-punched to enable a teacher or other user of the test scoring system to punch out the desired answer-indication apertures using a pencil or other similar instrument. This may result, however, in tearing or other inaccurate formation of the desired answer indicator apertures, and may lead to occasional inaccuracies in the scoring results. This difficulty can be obviated by the use of a simple locating punch, illustrated in FIG. 15, and comprising a punch member 451 and a die member 452. The punch 451 is provided with a punch element 453 and a locating element 454 that is disposed directly opposite an aperture 455 in the die member 452. To punch out the desired answer indicator aperture, the guide member 454 is first engaged in the selected small answer position aperture in the mask 335, indicated in FIG. 16 by the aperture 456. The guide member 454 can project through the opening 456 and into the corresponding opening 455 in the die member 452. In this manner, the punch and die can be brought together to punch the desired relatively large opening, the resulting aperture being accurately centered with respect to the answer position opening 456, which is included in the portion of the mask 335 that is punched out. Thus, the position openings in the mask 335 afford a convenient means for accurately locating the desired answer indicator apertures in addition to performing a useful function during the scoring operation itself as described hereinabove.

It will be understood, of course, that the circuit of FIG. 15 is merely exemplary, and that the same or equivalent results may be obtained with substantially different circuits. For example, the circuit can be modified to segregate the "correct answer" signals, those having an amplitude of four, to control a direct-adding counter, instead of using a countdown arrangement as described above. Other modifications will be readily apparent to those skilled in the art.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. An automatic test scoring machine for scoring test sheets of the kind comprising a plurality of columns of answer locations on each sheet, each answer location including a plurality of answer areas extending transversely of the column, said answer location in each column being aligned with the answer locations in adjacent columns in rows extending transversely of the sheet, said test scoring machine comprising: means for feeding test sheets one-by-one from a storage station through a sensing station; a light source for illuminating said test sheets as they traverse said sensing station; a plurality of photoelectric sensing devices, located at said sensing station in position to receive light from said test sheets, said sensing devices corresponding in number to the number of answer areas in each row on said test sheets; a rotary drum, interposed between said light source and said sensing devices; a master answer sheet mounted on said drum, having a plurality of answer-indicator areas of uniform size arranged in a pattern representative of correct answers on the test sheets and further having a plurality of answer-position areas of uniform smaller size in a pattern representative of incorrect answers on the test sheets; means for moving said master answer sheet through said sensing station synchronously with said test sheets; and electrically actuated scoring means, coupled to said sensing devices, for determining a test score.

2. An automatic test scoring machine for scoring test sheets of the kind comprising a plurality of columns of answer locations on each sheet, each answer location including a plurality of answer areas extending transversely of the column, said answer location in each column being aligned with the answer locations in adjacent columns in rows extending transversely of the sheet, said test scoring machine comprising: means for feeding test sheets one-by-one from a storage station through a sensing station; a light source for illuminating said test sheets as they traverse said sensing station; a plurality of photoelectric sensing devices, located at said sensing station in position to receive light from said test sheets, said sensing devices corresponding in number to the number of said answer areas in each row on said test sheets and being disposed in staggered array, by column groupings, relative to said rows of answer locations; a rotary drum, interposed between said light source and said sensing devices, and driven synchronously with said sheet feeding means; a mask, mounted on said drum, having a plurality of answer-indicator apertures therein arranged in a pattern representative of correct answers on the answer sheets and further having a plurality of answer-position apertures individually representative of the other answer areas on said answer sheets, said answer-position apertures being substantially smaller than said answer-indicator apertures; and electrically actuated scoring means, coupled to said sensing devices, for determining a test score based on variations between the mask apertures and markings in the test sheet answer areas, and affording a total score equal to the number of correct answers less the number of incorrect answers recorded on an answer sheet.

3. A test sheet set for automatic scoring by photoelectric comparison comprising: a master answer sheet having answer-indicator areas of given uniform size, and an alignment-indicator area of given size; a test sheet for receiving markings of a given opacity and comprising a sheet of paper of relatively light coloration having a plurality of answer locations arranged in a predetermined pattern thereon, each answer location including a broad dark border corresponding in opacity to said markings and encompassing and isolating a plurality of individual undarkened answer areas each substantially smaller in size than the size of said answer-indicator areas of said master answer sheet, said test sheet further having an alignment area in a location similar to the location of said alignment-indicator area on said master sheet and identified by a broad dark border encompassing said alignment area.

4. A test scoring system comprising: a master answer sheet having answer-indicator areas of given uniform size; a test sheet of paper of relatively light coloration having a plurality of answer locations arranged in rows and columns thereon, each answer location including a broad dark border of a given opacity encompassing and isolating a plurality of individual undarkened answer areas substantially smaller in size than the size of said answer-indicator areas of said master answer sheet, individual answers being indicated by marking over at least one answer area to a corresponding opacity; photoelectric sensing means for comparing the marked answer area with the answer-indicator areas on said master sheet; and scoring means, actuated by said sensing means, for determining a test score based on differences between the marked answer areas and the answer-indicator areas.

5. A test scoring system comprising: a master answer sheet having a plurality of answer-indicator areas of given uniform size indicative of correct answer positions and a plurality of answer-position areas of uniform smaller size indicative of incorrect answer positions; a test sheet of paper of relatively light coloration having a plurality of answer locations arranged in rows and columns thereon, each answer location including a broad dark border encompassing and isolating a plurality of individual undarkened answer areas substantially smaller in size than the size of said answer-indicator areas of said master answer sheet, individual answers being indicated by marking over at least one answer area in each answer location; photoelectric sensing means for comparing the marked answer areas with the answer-indicator and answer-position areas on said master sheet; and scoring means, actuated by said sensing means, for determining a right-minus-wrong test score based on differences between the marked answer areas and the answer-indicator areas.

6. A test scoring system comprising: a master answer sheet having a plurality of answer-indicator areas of given uniform size indicative of correct answer positions on a related test sheet and a plurality of answer-position areas of uniform smaller size indicative of incorrect answer positions; a test sheet of paper of relatively light coloration having a plurality of answer locations arranged in rows and columns thereon, each answer location including a predetermined number of individual answer areas, individual answers being indicated by marking at least one answer area in each answer location; sensing means for comparing the marked answer areas on the test sheet with the answer-indicator and answer-positions areas on said master sheet to develop distinguishing electrical signals; and scoring means, connected to said sensing means, for analyzing said signals to determine a right-minus-wrong test score based on differences between the marked answer areas and the answer-indicator areas.

7. An automatic test scoring system comprising: a plurality of test sheets of paper of relatively light coloration each having a plurality of answer locations arranged in a predetermined number of columns thereon, each answer location including a broad dark border of given opacity encompassing and isolating a plurality of individual normally undarkened answer areas of uniform size, individual answers being indicated by marking over at least one of the answer areas to a corresponding opacity; means for feeding said test sheets one-by-one from a storage station through a sensing station; a light source for illuminating said test sheets as they traverse said sensing station, a plurality of photoelectric sensing devices, located at said sensing station in position to receive light from said test sheets, said sensing devices corresponding in number to said columns on said test sheets; a rotary drum, driven synchronously with said sheet feeding means; a master answer sheet, mounted on said drum, and having a plurality of answer-indicator areas of uniform size substantially larger than said answer areas of said test sheets, said answer-indicator areas being arranged in a pattern representative of correct answers on the test sheets; and electrically actuated scoring means, coupled to said sensing devices, for determining a test score based on variations between the answer-indicator areas of said master sheet and the markings in the test sheet answer areas.

8. An automatic test scoring system comprising: a plurality of test sheets of paper of relatively light coloration each having a plurality of answer locations arranged in a predetermined pattern of columns and rows thereon, each answer location including a broad dark border of given opacity encompassing and isolating a plurality of individual undarkened answer areas of uniform size, individual answers being indicated by marking over at least one of the answer areas to a corresponding opacity said test sheets each having an alignment area thereon identified by a broad dark border encompassing the alignment area; means for feeding test sheets one-by-one from a storage station through a sensing station; a light source for illuminating said test sheets as they traverse said sensing station; a plurality of photoelectric sensing means, located at said sensing station in position to receive light from said test sheets, said sensing means corresponding in number to said columns on said test sheets; a rotary drum, interposed between said light source and said sensing means, and driven synchronously with said sheet feeding means; a mask, mounted on said drum, having a plurality of answer-indicating apertures therein of uniform size substantially larger than said answer areas of said test sheets, arranged in a pattern representative of correct answers on the test sheets and further having an alignment aperture therein; electrically actuated scoring means, coupled to said sensing means, for determining a test score based on variations between the answer-indicating mask apertures and markings in the test sheet answer areas; and control means, coupled to one of said sensing means for inhibiting operation of said scoring means in response to misalignment of said alignment aperture of said mask with the alignment area of any of said test sheets.

9. A test sheet set for automatic scoring by photoelectric comparison comprising: a master answer sheet having a plurality of answer-indicator areas of given uniform size; and a test sheet for receiving test markings of given opacity, comprising a sheet of paper of relatively light coloration having a plurality of answer locations arranged in a predetermined pattern thereon, each answer location including a broad dark border corresponding in opacity to said markings and encompassing and isolating a plurality of individual undarkened answer areas each substantially smaller in size than the size of said answer-indicator areas of said master answer sheet, said test sheet being positionable into face-to-face relationship with the master sheet and having its answer locations aligned with respectively corresponding answer-indicator areas on said master sheet.

10. A test sheet set for automatic scoring by photoelectric comparison comprising: a master answer sheet having a plurality of answer-indicator areas of given uniform size; and a test sheet for receiving test markings of given opacity, comprising a sheet of relatively translucent paper imprinted with a plurality of answer locations arranged in rows and columns thereon, each answer location including a broad dark border corresponding in opacity to said markings and encompassing and isolating a plurality of individual undarkened answer areas each substantially smaller in size than the size of said answer-indicator areas of said master answer sheet, said test sheet being positionable into face-to-face relationship with the master sheet and having its answer locations aligned with respectively corresponding answer-indicator areas on said master sheet.

References Cited by the Examiner

UNITED STATES PATENTS

| | | | |
|---|---|---|---|
| RE. 20,463 | 8/37 | Sveda et al. | 35—48 |
| 2,010,653 | 8/35 | Warren. | |
| 2,150,256 | 3/39 | Warren | 35—48 |
| 2,244,257 | 6/41 | Maul | 235—61.115 XR |
| 2,297,743 | 10/42 | Carroll et al. | 235—61.115 |
| 2,528,828 | 11/50 | Henry | 35—48 |
| 2,690,301 | 9/54 | Wilson | 235—61.12 |
| 2,694,266 | 11/54 | Roeder | 35—48 |
| 2,717,460 | 9/55 | Stibitz | 35—48 |
| 2,921,736 | 1/60 | Hatherell et al. | 235—61.11 |
| 2,953,300 | 9/60 | O'Brien et al. | 235—61.12 |
| 2,963,220 | 12/60 | Kosten et al. | 235—61.12 |
| 3,011,703 | 12/61 | Rand | 235—61.11 |
| 3,050,248 | 8/62 | Lindquist | 35—48 XR |

JEROME SCHNALL, *Primary Examiner.*

LEO SMILOW, *Examiner.*